United States Patent
Garwon et al.

(10) Patent No.: US 11,614,043 B2
(45) Date of Patent: Mar. 28, 2023

(54) METHOD FOR SETTING A THROTTLE VALVE, ENGINE CONTROL UNIT, AND A VEHICLE

(71) Applicant: Volkswagen Aktiengesellschaft, Wolfsburg (DE)

(72) Inventors: Maiko Garwon, Braunschweig (DE); Kostyantyn Bass, Vellmar (DE)

(73) Assignee: Volkswagen Aktiengesellschaft, Wolfsburg (DE)

( * ) Notice: Subject to any disclaimer, the term of this patent is extended or adjusted under 35 U.S.C. 154(b) by 32 days.

(21) Appl. No.: 17/377,504

(22) Filed: Jul. 16, 2021

(65) Prior Publication Data
US 2022/0018294 A1    Jan. 20, 2022

(30) Foreign Application Priority Data

Jul. 16, 2020    (DE) .................... 10 2020 208 865.9

(51) Int. Cl.
*F02D 41/14*    (2006.01)
*F02D 41/00*    (2006.01)

(52) U.S. Cl.
CPC ..... *F02D 41/1401* (2013.01); *F02D 41/0002* (2013.01); *F02D 2041/1433* (2013.01); *F02D 2200/0406* (2013.01); *F02D 2200/0408* (2013.01)

(58) Field of Classification Search
CPC ......... F02D 41/0002; F02D 2041/1433; F02D 2200/0406
See application file for complete search history.

(56) References Cited

U.S. PATENT DOCUMENTS

| | | |
|---|---|---|
| 6,672,060 B1 | 1/2004 | Buckland et al. |
| 7,373,920 B2 | 5/2008 | Gruenter |
| 7,400,967 B2 | 7/2008 | Ueno et al. |
| 7,805,939 B2 | 10/2010 | Kimoto et al. |
| 9,567,924 B2 | 2/2017 | Tanaka |
| 9,751,411 B2 | 9/2017 | Benjey et al. |
| 9,797,299 B2 | 10/2017 | Hansen et al. |
| 10,041,451 B2 | 8/2018 | Zhang |
| 10,302,048 B2 | 5/2019 | Zhang |
| 10,634,073 B2 | 4/2020 | Lahti et al. |
| 2002/0055814 A1 | 5/2002 | Kobayashi et al. |

(Continued)

FOREIGN PATENT DOCUMENTS

| | | |
|---|---|---|
| DE | 102005056675 A1 | 6/2006 |
| DE | 102006020062 A1 | 10/2007 |

(Continued)

OTHER PUBLICATIONS

Hilsch et al; "Internal Model Control of Nonlinear Systems with Input Saturation"; Automatisierungstechnik AT vol. 59, No. 6 Jun. 1, 2011.

(Continued)

*Primary Examiner* — Ngoc T Nguyen
(74) *Attorney, Agent, or Firm* — Muncy, Geissler, Olds & Lowe, P.C.

(57) ABSTRACT

A method for setting a throttle valve that includes feedback control of a throttle position of the throttle valve in the entire operating range of an internal combustion engine, wherein the feedback control is based on an internal model control principle.

13 Claims, 5 Drawing Sheets

(56) References Cited

U.S. PATENT DOCUMENTS

| | | | |
|---|---|---|---|
| 2016/0131089 A1 | 5/2016 | Lahti et al. | |
| 2016/0363063 A1* | 12/2016 | Pochner | F02D 41/062 |
| 2019/0292998 A1 | 9/2019 | Garwon et al. | |

FOREIGN PATENT DOCUMENTS

| | | |
|---|---|---|
| DE | 102017111122 A1 | 11/2017 |
| DE | 102018106849 A1 | 9/2019 |
| DE | 1010218120975 A1 | 3/2020 |
| EP | 1811160 A1 | 7/2007 |
| EP | 3020940 B1 | 6/2018 |
| EP | 3543514 A1 | 9/2019 |
| WO | WO2017103384 A1 | 6/2017 |

OTHER PUBLICATIONS

Colin et al; "Neural Control of Fast Nonlinear Systems—Application to a turbocharged SI Engine with VCT". OEEE Transactions on Neural Networks, No. 18 No. 4 Jul. 1, 2007.

\* cited by examiner

METHOD FOR SETTING A THROTTLE VALVE, ENGINE CONTROL UNIT, AND A VEHICLE

This nonprovisional application claims priority under 35 U.S.C. § 119(a) to German Patent Application No. 10 2020 208 865.9, which was filed in Germany on Jul. 16, 2020, and which is herein incorporated by reference.

BACKGROUND OF THE INVENTION

Field of the Invention

The present invention relates to a closed-loop control of the intake manifold pressure close to pressure equalization at the throttle valve.

Description of the Background Art

Internal combustion engines convert chemical energy into mechanical energy. For this purpose, a flammable mixture of fuel and air is introduced into a combustion chamber, where it is ignited. The torque delivered by the internal combustion engine is set by throttling the quantity of air in the mixture with a throttle valve. A throttle valve is the component of the internal combustion engine with which the torque created by the throttling of the flow rate is set (quantity control). It is located in the intake tract between the air filter and the intake header or the fan-like branching intake manifold of the engine. The throttle valve is opened by pressing the accelerator pedal. The opening of the throttle valve does not necessarily depend directly on the position of the pedal. In particular, the electronic transmission of the accelerator pedal position to the throttle valve permits an active intervention in the valve opening by means of a control unit. In this process, both the speed of the opening and the position of the valve are affected as a function of the pedal position. The goal here is to improve the drivability of powerful engines or to improve ride comfort for the occupants. In addition, assistance systems such as cruise control or traction control are made possible.

U.S. Pat. No. 7,805,939 B2 relates to a torque base control unit. The torque base control unit calculates the desired torque based on an accelerator pedal position and an engine speed. The torque base control unit also carries out a calculation of the desired airflow rate, a calculation of the desired intake pressure, and a calculation of the desired boost pressure based on the desired torque. The desired throttle position is calculated based on the desired airflow rate, the desired intake pressure, the desired boost pressure, the actual boost pressure, and the throttle valve intake temperature. An auxiliary control unit calculates the target turbine output based on the desired airflow rate and the desired boost pressure, which are calculated by the torque base control unit, and calculates the actual turbine output based on exhaust-gas information. The assist power of an engine connected to a turbocharger is calculated based on the power difference between the desired turbine output and the actual turbine output.

U.S. Pat. No. 9,567,924 B2 discloses a control unit that confirms by a monitoring device that a desired throttle opening degree of an electronically controlled throttle is to be matched with a reference throttle opening degree as reference. A first arithmetic unit performs calculation of the desired throttle opening degree. The first arithmetic unit calculates a desired throttle opening degree on the basis of a desired intake air quantity and a measured value or an estimated value of a boost pressure, by using an inverse model of an air model that expresses a dynamic relationship that is established between the boost pressure, a throttle opening degree, and an intake air quantity. A second arithmetic unit calculates a reference throttle opening degree on the basis of the desired intake air quantity and a measured value or an estimated value of an atmospheric pressure in a steady state. To do so, it uses a correlation between the intake air flow rate and an intake header pressure in a steady state, and a correlation between a throttle upstream pressure, the intake header pressure, and a throttle flow rate in a steady state.

U.S. Pat. No. 9,797,299 B2 discloses a supercharged internal combustion engine. The supercharged internal combustion engine has a supercharger that can be operated such that it selectively supplies a mass of air according to the operating requirements of the engine. The air pressure in this case can comprise a range from below through above atmospheric air pressure. The supercharger has a shuttle in combination with a throttle valve that controls the mass of air, which is directed to an air mass bypass opening and supplied to the internal combustion engine. The shuttle has rollers that run on rails that allow the shuttle to open and close the air mass bypass opening for connection to a housing that directs a quantity of atmospheric air and a quantity of bypass air, which is mixed with the quantity of atmospheric air, to an air mass inlet of the supercharger.

SUMMARY OF THE INVENTION

It is therefore an object of the present invention to provide a more accurate steady-state closed-loop control of the intake manifold pressure (and thus also of the fresh air charge in the cylinder) with the throttle valve.

A first aspect of the present invention relates to a method for setting a throttle valve, comprising: feedback control of a throttle position of the throttle valve in the entire operating range of an internal combustion engine, wherein the feedback control is based on an internal model control principle.

The internal combustion engine can be a spark ignition engine. A spark ignition engine is an internal combustion engine with externally supplied ignition. In this case an air/fuel mixture is burned, and thus the chemical energy contained in the fuel is released and converted into mechanical energy.

The closed-loop control of the intake manifold pressure in the region of pressure equalization—approximately equal pressure before and after the throttle valve—at the throttle valve ("overtravel of the throttle valve") entails certain difficulties. Thus, for instance, the response of the intake manifold pressure (pressure downstream of the throttle valve—after the throttle valve) in the region of pressure equalization is increasingly insensitive to throttle valve movements, which has the result that, as the opening angle of the throttle valve increases, the resultant pressure changes in the intake manifold and the accompanying changes in the mass flow through the throttle valve likewise become ever smaller.

In order to maintain the control loop dynamics, the gain of the intake manifold pressure controller can be progressively raised, although this can also bring about the result that high-frequency measurement noise (e.g., pulsations in the measured intake manifold pressure) can be amplified as well, and consequently higher-frequency pulsations can also arise in the desired value of the throttle position (actuating variable of the intake manifold pressure controller). Such pulsations can have an adverse effect on the service life of the component of the throttle valve. Consequently, it may happen that the controller gain is not increased as necessary. As a result, the control loop dynamics and thus also drivability and disturbance transfer behavior (for instance, the correction of disturbances resulting from the introduction into the intake manifold of an additional mass flow originating from the fuel-tank ventilation) may be impaired.

For this reason, in one current technical implementation a pure open-loop control concept (with no closed-loop control) has been implemented for setting a desired intake manifold pressure in the region of pressure equalization at the throttle valve. This means that the intake manifold pressure control is deactivated, and the open-loop control for setting a desired intake manifold pressure is activated, as soon as the ratio of the upstream pressure ahead of the throttle valve (intake manifold pressure) and the downstream pressure after the throttle valve (boost pressure) exceeds a predetermined limit value. The opening angle of the throttle valve required for this purpose is directly pre-controlled in this region as a function of desired mass flow and desired intake manifold pressure.

In the case of a pure open-loop control of the throttle position without feedback in the region of overtravel of the throttle valve, in principle it is possible under certain circumstances that the steady-state accuracy between the pre-determined desired intake manifold pressure and the measured intake manifold pressure can no longer be ensured in this operating range as a result of manufacturing tolerances or aging effects. The pressure set by the throttle valve in the intake manifold consequently does not match the required fresh air charge in the cylinder. This can also have the result that too much fresh air is contained in the cylinder so that the ignition timing is consequently opened up by the so-called torque structure in the engine control unit. This causes an increased fuel consumption, since too much fresh air is contained in the cylinder at this operating point and more fuel must accordingly be injected for operation at lambda=1. The "excess" torque of the cylinder is automatically converted into heat and not into kinetic energy by the enabled ignition timing adjustment (retarding of the ignition timing).

Another disadvantage of pure open-loop control is that the diagnostics running in the engine control unit for detecting a faulty intake manifold pressure sensor and boost pressure sensor can be adversely affected in their detection quality as soon as one of the abovementioned sensors no longer behaves according to its specification. In such a case, the pure open-loop control concept currently implemented in the engine control unit is used to calculate the desired throttle positions that lead to relatively large steady-state deviations between the desired fresh air charge and the actual fresh air charge. In addition to the ignition timing adjustments caused thereby, a cyclic change between activation of the intake manifold pressure control and activation of the pure open-loop control principle (and the accompanying deactivation of the intake manifold pressure controller) can also come about. Because of these switchovers, larger changes in the throttle opening occur when pressure sensors deviate from their specifications, which in turn can have adverse effects on the detection quality of the sensor diagnostics. This has the result that a faulty pressure sensor may not be detected in a timely manner.

Steady-state accuracy of the intake manifold pressure or of the fresh air charge can be increased with the use of closed-loop control of the intake manifold pressure in the region of pressure equalization at the throttle valve. Moreover, it is possible to avoid ignition timing adjustments that are necessary in the event of excess fresh air charge and thus excess torque (charge overshoot). In addition, it is possible to avoid a toggling between closed-loop control of the intake manifold pressure (when there are relatively large pressure differences at the throttle valve) and open-loop control of the intake manifold pressure (close to pressure equalization at the throttle valve), despite a defective intake manifold pressure sensor.

The method can also relate to an internal combustion engine with supercharging. A model of the fresh air charge in the cylinder and a pressure sensor in the intake manifold can be used for implementation of the method.

The method can comprise the continuous closed-loop control of the throttle position in the entire operating range of the internal combustion engine. The area of application extends from the intake range through the overtravel range to the supercharged operating range of the internal combustion engine. The method makes it possible to manage the position of the throttle valve with closed-loop control, even in the region of pressure equalization across the throttle valve ("overtravel of the throttle valve"). Above all, this makes it possible to set the intake manifold pressure accurately in a steady state even in this operating range. Because of the steady-state accuracy of the intake manifold pressure, it is also ensured that the requisite desired fresh air charge in the cylinder is set.

The method can also assist intake manifold pressure control in this range by means of a variable turbine geometry (VTG). Especially during phases of load reduction, the method that has been developed can improve the position of the throttle valve and consequently prevent "pushing".

The internal model control (IMC) principle is a closed-loop control method from control engineering that is the implicit foundation of all predictive controllers. Controllers using the IMC principle contain a mathematical model of the process that is as close to reality as possible, and a compensation element.

In some embodiments, the entire operating range of the internal combustion engine can comprise an intake range, an overtravel range (pressure equalization), and a supercharged operating range of the internal combustion engine.

The closed-loop control of a throttle position of the throttle valve in the range of the overtravel of the throttle valve is advantageous, because steady-state accuracy between the predetermined desired intake manifold pressure and the measured intake manifold pressure can be ensured in this operating range on account of manufacturing tolerances or aging effects. The pressure set by the throttle valve in the intake manifold therefore does indeed correspond to the required fresh air charge in the cylinder.

The feedback control can receive a desired intake manifold pressure as input variable, and calculate a desired area of the throttle valve based on the desired intake manifold pressure.

The desired area of the throttle valve can be provided to a process and to a process model simultaneously in accordance with the IMC principle.

The simultaneous provision of the desired area of the throttle valve in accordance with the IMC principle is advantageous, since the closed-loop control of the throttle position of the throttle valve can become more robust to disturbances and model mismatches.

The calculated desired area can be a desired area limited by physical actuator limits.

The physical actuator limit in this context is the physical component limit of the throttle valve. The limiting of the calculated desired area is advantageous, since a more realistic desired area for the closed-loop control of the throttle position of the throttle valve can be provided.

The process can determine the position of the throttle valve based on the calculated desired area and can measure the intake manifold pressure thus created, and the process model can determine a modeled intake manifold pressure based on the calculated desired area.

In some embodiments, the feedback control can identify a difference between the measured intake manifold pressure and the modeled intake manifold pressure, and can identify a corrected desired intake manifold pressure based on the identified difference.

The desired area of the throttle valve can be calculated as follows:

$$A_{DK,soll} = \frac{\frac{V}{KRT_2}\dot{p}_{SPcor,f} + W_{viv}(p) - W_{TEV}}{p_1 \sqrt{\frac{2}{RT_1}} \Psi(p)} - A_{DK,leak} \quad (Eq.\ 1)$$

where: V is the volume of the intake manifold, R is the specific gas constant of air, K is the isentropic exponent, p is the air pressure in the intake manifold, $T_2$ is the temperature of the air in the intake manifold, $w_{viv}(p)$ is the outgoing air mass flow as a function of the air pressure p that flows out of the intake manifold through the intake valves, $w_{TEV}$ is the incoming air mass flow that flows into the intake manifold through the fuel-tank ventilation valve, $p_1$ is the air pressure that is present upstream of the throttle valve, $T_1$ is the temperature of the air that flows into the intake manifold through the throttle valve, $\Psi(p)$ is the flow function as a function of the air pressure p, and $A_{DK,leak}$ is the effective leakage area of the throttle valve.

The modeled intake manifold pressure can be calculated as follows:

$$\hat{p} = \int (\dot{\hat{p}})dt, \quad (Eq.\ 2)$$

Where $$\frac{V}{KRT_2}(\dot{\hat{p}}) = \sum W_G = W_{thr} - W_{viv} + W_{TEV} = \quad (Eq.\ 3)$$

$$p_1 \sqrt{\frac{2}{RT_1}} (A_{DK,lim} + A_{DK,leak}) \Psi(p) - w_{viv}(p) + w_{TEV},$$

and where: $W_G$ is the air mass flow in the intake manifold, $W_{thr}$ is the incoming air mass flow that flows into the intake manifold through the throttle valve, $p_1$ is the air pressure upstream of the throttle valve (boost pressure), V is the volume of the intake manifold, R is the specific gas constant of air, K is the isentropic exponent, p is the air pressure in the intake manifold, $T_2$ is the temperature of the air in the intake manifold, $w_{viv}(p)$ is the outgoing air mass flow as a function of the air pressure p that flows out of the intake manifold through the intake valves, $w_{TEV}$ is the incoming air mass flow that flows into the intake manifold through the fuel-tank ventilation valve, $T_1$ is the temperature of the air that flows into the intake manifold through the throttle valve, $\Psi(p)$ is the flow function as a function of the air pressure p, and $A_{DK,leak}$ is the effective leakage area of the throttle valve.

The feedback control can additionally filter the desired intake manifold pressure by means of a filter.

The filter can be a $PT_1$ element, for example. A $PT_1$ element, also referred to as a first order lag element, is used in control engineering to describe systems with lag characteristics. The desired intake manifold pressure can be stabilized by the filtering.

The feedback control can additionally filter the desired area of the throttle valve by means of a filter.

The filter can be a $PT_1$ element, for example. The filtering can stabilize and steady the desired area of the throttle valve.

The feedback control can additionally filter the difference between the measured intake manifold pressure and the modeled intake manifold pressure by means of a filter.

The filter can be a $PT_1$ element, for example. Measurement noise can be suppressed by filtering this difference.

The feedback control of the throttle position of the throttle valve in the supercharged operating range of the internal combustion engine can be assisted by a variable turbine geometry (VTG).

For example, the intake manifold pressure can be raised/lowered in the supercharged operating range by a compressor of an exhaust turbocharger if the difference between the required intake manifold pressure (=desired intake manifold pressure) and the measured intake manifold pressure is (too) large/(too) small.

A second aspect relates to an engine control unit that is equipped to carry out a method according to one of the preceding embodiments.

A third aspect relates to a vehicle with the preceding engine control unit.

Further scope of applicability of the present invention will become apparent from the detailed description given hereinafter. However, it should be understood that the detailed description and specific examples, while indicating preferred embodiments of the invention, are given by way of illustration only, since various changes, combinations, and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
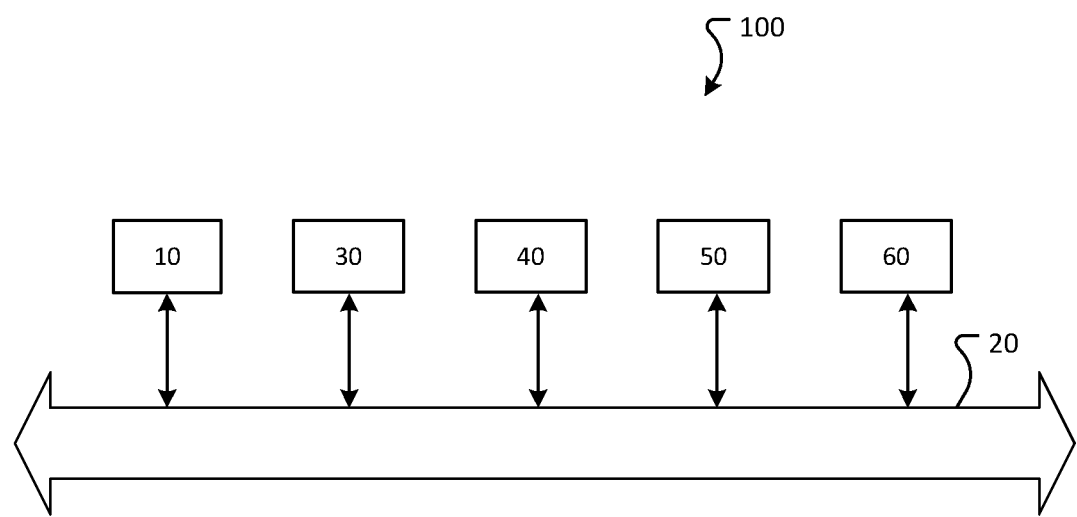
FIG. 1 shows a block diagram that schematically represents the configuration of a vehicle according to an exemplary embodiment of the present invention.

FIG. 1 shows a block diagram that schematically represents the configuration of a vehicle according to an exemplary embodiment of the present invention.

The vehicle 100 includes multiple components that communicate with one another over a data bus 20, namely an engine control unit 10, a throttle control unit 30, an exhaust turbocharger control unit 40, a transmission control unit 50, and a clutch control unit 60. The vehicle 100 can be driven by an internal combustion engine, wherein the internal combustion engine is a multicylinder spark ignition engine.

An engine control unit (ECU) 10 is an electronic control unit that controls a number of actuators of the internal combustion engine in order to ensure optimal engine performance. For example, the engine control unit (ECU) 10 can control the position of a throttle valve and/or the operation of an exhaust turbocharger. The control of the throttle valve and/or of the exhaust turbocharger can be based on a continuous closed-loop control (intake manifold pressure control, boost-pressure control) over the entire operating range (intake range, overtravel range (pressure equalization), supercharged operating range) of the internal combustion engine 4. A more detailed explanation of the closed-loop control can be found under FIG. 3 below.

The data bus 20 can be implemented according to communications technologies such as CAN (controller area network), LIN (local interconnect network), FlexRay, LAN/Ethernet or MOST, for example. Multiple different bus types can also be used in combination in the vehicle.

The throttle control unit 30 controls the throttle position of a throttle valve, wherein the control of the throttle control unit 30 is based on the continuous closed-loop control of the engine control unit (ECU) 10. A throttle valve is arranged in the intake tract of the internal combustion engine. The throttle valve regulates the delivery of air or mixture to the internal combustion engine.

The exhaust turbocharger control unit 40 controls the operation of an exhaust turbocharger, wherein the control of the exhaust turbocharger is based on the boost-pressure control of the engine control unit (ECU) 10. An exhaust turbocharger compresses the combustion air delivered to the internal combustion engine. An exhaust turbocharger includes a turbine and a compressor. A portion of the energy of the exhaust gas of the internal combustion engine is used to drive the turbine. The compressor is mounted on a turbocharger shaft opposite the turbine. The compressor draws in the combustion air and delivers it in compressed form to the internal combustion engine.

The transmission control unit 50 analyzes relevant sensor signals and, with the aid of the engine control unit, converts them into control commands for the transmission actuators. The transmission control unit 20 can be a dual-clutch transmission, which permits fully automatic gear shifting with no interruption of traction by means of two subtransmissions. The transmission control unit 50 selects the gears on the basis of control signals from the engine control unit 10 or by driver command (shift paddles/selector levers).

The clutch control unit 60 is a clutch system for vehicle transmissions in which the opening (disengagement) and closing (engagement) of the separating clutches is triggered by signals from the engine control unit (ECU) 10.

Figure 2:
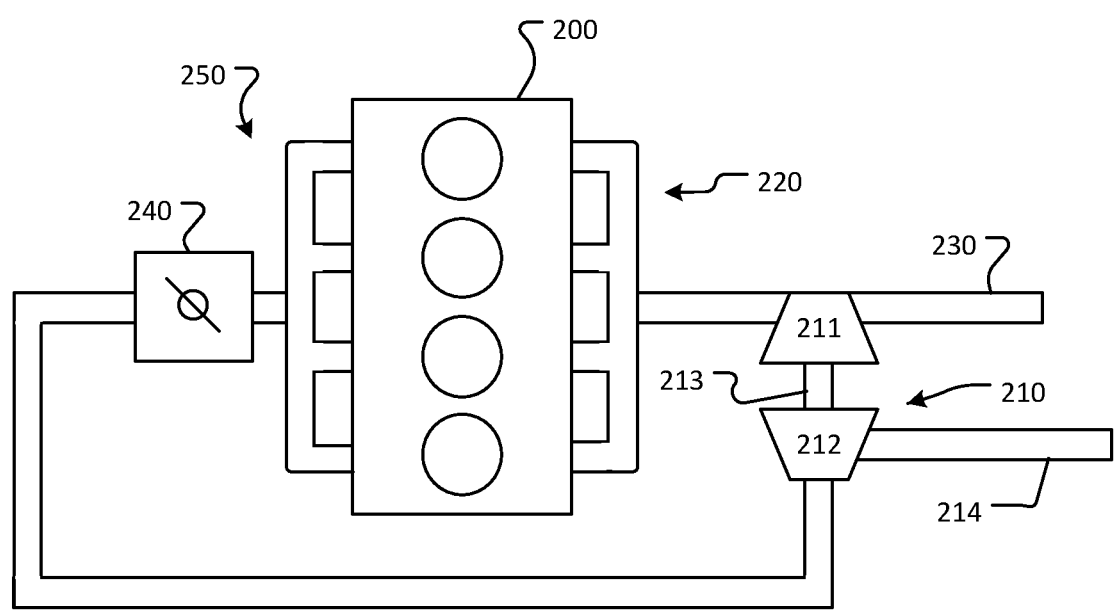
FIG. 2 shows a block diagram that schematically represents the configuration of a 4-cylinder internal combustion engine of a vehicle according to an exemplary embodiment of the present invention.

FIG. 2 shows a block diagram that schematically represents the configuration of a 4-cylinder internal combustion engine of a vehicle according to an exemplary embodiment of the present invention.

The internal combustion engine 200 is coupled to an exhaust turbocharger 210, which includes a turbine 211 and a compressor 212, wherein the turbine 211 and the compressor 212 are located on a common shaft 213, the so-called turbocharger shaft.

The turbine 211 is connected to the internal combustion engine 200 by an exhaust manifold 220. The turbine 211 receives the exhaust gas of the internal combustion engine 200 through the exhaust manifold 220, and uses the energy contained in the exhaust gas of the internal combustion engine 200 to drive the compressor 212. The compressor 212 is coupled to an air filter through an intake runner 214. The compressor 212 draws in the fresh air that is filtered through the air filter, and forces precompressed air into the individual cylinders of the internal combustion engine 200. In addition, the turbine 211 is connected to an exhaust emission system by an exhaust pipe 230 in the direction of exhaust gas flow. The exhaust emission system breaks down the pollutants in the exhaust gases produced during operation of the internal combustion engine 200 and discharges the remaining exhaust gases. The turbocharger shaft 213 of the exhaust turbocharger 210 rotates ever faster with increasing motor speed and power on account of the increasing quantities of exhaust gas that drive it. At a certain speed, the compressor 212 reaches its delivery limit, and the danger also exists that the mechanical and thermal limits of the exhaust turbocharger 210 or of the internal combustion engine 200 will be exceeded. The supercharging of the internal combustion engine 200 that is desired at low speeds can become problematic at higher speeds. In order to avoid this, the exhaust turbocharger 210 is equipped with boost-pressure control, which makes it possible for the supercharger to deliver high output even at low exhaust gas flows and to not exceed the load limit at high speeds. A pressure sensor provides the current actual boost pressure to the engine control unit (10 in FIG. 1). Based on the current actual boost pressure, the engine control unit (10 in FIG. 1) controls the boost pressure. The boost-pressure control has the task of leveling out the difference between desired and actual boost pressures as quickly as possible. To this end, the boost-pressure control moves the actuator that is present (wastegate or adjustable guide vanes (variable turbine geometry, VTG)) as the actuating variable. The air that is drawn in and precompressed by the compressor is delivered to the throttle valve 240. The throttle valve 240 controls the passage of air that is precompressed to a greater or lesser degree into the individual cylinders of the internal combustion engine 200 as a function of the opening angle. The flow of precompressed air controlled by the throttle valve 240 is delivered to the individual cylinders of the internal combustion engine 200 through an intake manifold 250. The intake manifold 250 includes a pressure sensor that measures the current actual boost pressure of the intake manifold pressure. The throttle position of the throttle valve 240 is controlled through continuous closed-loop control of the throttle position in the entire operating range of the internal combustion engine 200. The area of application extends from the intake range through the overtravel range (pressure equalization at the throttle valve) to the supercharged operating range of the internal combustion engine. Due to the continuous closed-loop control of the throttle position in the entire operating range of the internal combustion engine 200, it is possible to set the intake manifold pressure accurately in a steady state in the entire operating range, as well. Because of the steady-state accuracy of the intake manifold pressure, it is additionally ensured that the requisite desired fresh air charge in the cylinder is set. Moreover, the continuous closed-loop control of the throttle position can also assist intake manifold pressure control in supercharged internal combustion engines with variable turbine geometry (VTG), as well. During phases of load reduction, the position of the throttle valve can have an assistive effect as a result of the continuous closed-loop control of the throttle position and consequently prevent pushing. Detailed closed-loop control of the throttle position is represented in FIG. 3.

Figure 3:
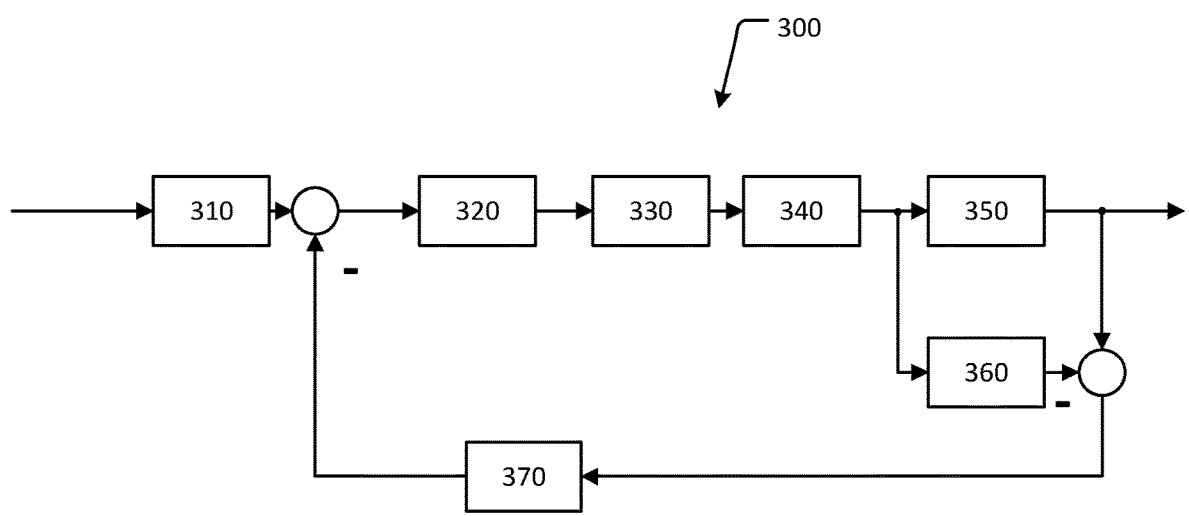
FIG. 3 shows, as an exemplary embodiment, a closed-loop control system for the closed-loop control of the throttle position in the intake, overtravel, and boost ranges of the internal combustion engine.

FIG. 3 shows, as an exemplary embodiment, a closed-loop control system for the closed-loop control of the throttle position in the intake, overtravel, and boost ranges of the internal combustion engine.

The closed-loop control system 300 shows a closed internal model control (IMC) control loop. An IMC control loop is a process that simulates the response of the system in order to estimate the result of a system disturbance. The closed-loop control system 300 includes three filters 310, 330, and 370, a model-based precontrol 320, a limiting element 340, a process 350, and a process model 360.

The filters 310, 330, and 370 can be low-pass filters, for example. A low-pass filter (LPF) is a filter that allows signals with a frequency below a selected limit frequency to pass and that attenuates signals with frequencies above the limit frequency. The precise frequency response of the filter depends on the filter design. In one embodiment, the filters 310, 330, and 370 can be $PT_1$ elements or $PT_2$ elements. A $PT_1$ element is a linear time-invariant system (LTI) transfer element that has proportional transfer behavior with first order lag (low-pass). A $PT_2$ element is an LTI transfer element in control engineering that has proportional transfer behavior with second order lag. Because of its complex conjugate poles, the $PT_2$ element responds to an input signal change with a damped oscillatory output signal.

The desired intake manifold pressure $p_{SP}$ constitutes the input in the closed-loop control system. This desired intake manifold pressure $p_{SP}$ is filtered with the $PT_1$ element 310 to form the time derivative and stabilize the desired value. First, the time-filtered difference $\Delta p_f$ between the process 350 and the process model 360 is subtracted from this time-filtered desired value $p_{SP,f}$, resulting in the corrected desired value $p_{SPcor,f}$. Next, the model-based precontrol 320 calculates a desired area of the throttle valve $A_{DK,coll}$ from the corrected desired value $p_{SPcor,f}$. This desired value $A_{DK,soll}$ is stabilized and steadied by the $PT_1$ element 330. The dynamics of the controller can also be set with the $PT_1$ element 330. Then the time-filtered desired area of the throttle valve $A_{DK,soll,f}$ is limited by a limiting element 340 of the physical actuator limits $A_{DK,lim}$ and provided to the process 350 and the process model 360 simultaneously in accordance with the IMC principle. The throttle valve is adjusted on the basis of the limited desired area of the throttle valve $A_{DK,lim}$. The intake manifold pressure p resulting from the throttle position is measured by a pressure sensor. The measured intake manifold pressure p and the modeled intake manifold pressure $\hat{p}$ may deviate from one another on account of noise that is introduced into the system either through internal sources (e.g., sensor noise—body sensors are not perfect) or external sources (e.g., unforeseeable forces from outside the body). The difference $\Delta p$ between the measured intake manifold pressure p and the modeled intake manifold pressure $\hat{p}$ is filtered with the $PT_1$ element 370 and fed back in order to shape the dynamics and suppress measurement noise. Consequently the control loop is closed. A detailed method approach for the model-based precontrol 320 is shown in FIG. 4, and a detailed method approach for the process model 360 is shown in FIG. 5.

Figure 4:
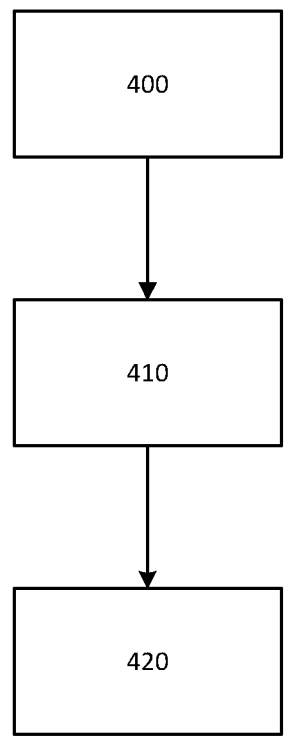
FIG. 4 shows, as an exemplary embodiment, an approach to a method for model-based precontrol of the closed-loop control system.
Figure 5:
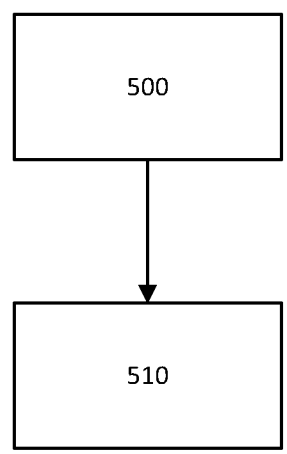
FIG. 5 shows, as an exemplary embodiment, an approach to a method for the process model of the closed-loop control system.

FIG. 4 shows, as an exemplary embodiment, an approach to a method for model-based precontrol of the closed-loop control system.

In step 400, the model-based precontrol receives the corrected desired value $p_{SPcor,f}$ and the time derivative of the desired value $\dot{p}_{SPcor,f}$.

In step 410, the desired area of the throttle valve (effective cross-sectional area of the throttle valve $A_{DK,soll}$ is calculated on the basis of the received desired values $p_{SPcor,f}$ and $\dot{p}_{SPcor,f}$. The desired area of the throttle valve $A_{DK,coll}$ is calculated as follows:

$$A_{DK,soll} = \frac{\frac{V}{KRT_2}\dot{p}_{SPcor,f} + W_{viv}(p) - W_{TEV}}{p_1\sqrt{\frac{2}{RT_1}}\Psi(p)} - A_{DK,leak}, \quad \text{(Eq. 1)}$$

where: V is the volume of the intake manifold, R is the specific gas constant of air, K is the isentropic exponent, p is the air pressure in the intake manifold, $T_2$ is the temperature of the air in the intake manifold, $w_{viv}(p)$ is the outgoing air mass flow as a function of the air pressure p that flows out of the intake manifold through the intake valves, $w_{TEV}$ is the incoming air mass flow that flows into the intake manifold through the fuel-tank ventilation valve, $p_1$ is the air pressure that is present upstream of the throttle valve, $T_1$ is the temperature of the air that flows into the intake manifold through the throttle valve, $\Psi(p)$ is the flow function as a function of the air pressure p, and $A_{DK,leak}$ is the effective leakage area of the throttle valve. The effective leakage area of the throttle valve $A_{DK,leak}$ can arise as a result of an incomplete closure of the throttle valve.

The effective leakage area of the throttle valve $A_{DK,leak}$, the temperature $T_1$ of the air that flows into the intake manifold through the throttle valve, and the temperature $T_2$ of the air in the intake manifold can be identified by means of a reference characteristic map. The reference characteristic map can be identified in a normal operating mode on the test stand by means of mass flow and boost pressure variations. Alternatively, the temperatures $T_1$ and $T_2$ can be measured by sensors.

In step 420, the calculated desired area of the throttle valve $A_{DK,soll}$ is transmitted to the $PT_1$ element (330 in FIG. 3).

FIG. 5 shows, as an exemplary embodiment, an approach to a method for the process model of the closed-loop control system.

In step 500, the process model receives the limited desired area of the throttle valve $A_{DK,lim}$.

In step 510, the modeled intake manifold pressure $\hat{p}$ is calculated on the basis of the received limited desired area of the throttle valve $A_{DK,lim}$. The modeled intake manifold pressure $\hat{p}$ is calculated as follows:

$$\hat{p} = \int(\dot{\hat{p}})dt, \quad \text{(Eq. 2)}$$

where $$\frac{V}{KRT_2}(\dot{\hat{p}}) = \sum W_G = W_{thr} - W_{viv} + W_{TEV} = \quad \text{(Eq. 3)}$$

$$p_1\sqrt{\frac{2}{RT_1}}(A_{DK,lim} + A_{DK,leak})\Psi(p) - w_{viv}(p) + w_{TEV} \text{ is.}$$

Here: $W_G$ is the air mass flow in the intake manifold, $W_{thr}$ is the incoming air mass flow that flows into the intake manifold through the throttle valve, $p_1$ is the air pressure upstream of the throttle valve (boost pressure), V is the volume of the intake manifold, R is the specific gas constant of air, K is the isentropic exponent, p is the air pressure in the intake manifold, $T_2$ is the temperature of the air in the intake manifold, $w_{vlv}(p)$ is the outgoing air mass flow as a function of the air pressure p that flows out of the intake manifold through the intake valves, $w_{TEV}$ is the incoming air mass flow that flows into the intake manifold through the fuel-tank ventilation valve, $T_1$ is the temperature of the air that flows into the intake manifold through the throttle valve, $\Psi(p)$ is the flow function as a function of the air pressure p, and $A_{DK,leak}$ is the effective leakage area of the throttle valve.

The effective leakage area of the throttle valve $A_{DK,leak}$, the temperature $T_1$ of the air that flows into the intake manifold through the throttle valve, and the temperature $T_2$ of the air in the intake manifold can be identified by means of a reference characteristic map. The reference characteristic map can be identified in a normal operating mode on the test stand by means of mass flow and boost pressure variations. Alternatively, the temperatures $T_1$ and $T_2$ can be measured by sensors.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A method for setting a throttle valve, the method comprising:
   feedback controlling a throttle position of the throttle valve in an entire operating range of an internal combustion engine; and
   basing the feedback control on an internal model control (IMC) principle,
   wherein the feedback control comprises:
      receiving a desired intake manifold pressure as input variable; and
      calculating a desired position of the throttle valve based on the desired intake manifold pressure, and
   wherein the feedback control additionally filters the desired intake manifold pressure via a filter.

2. The method according to claim 1, wherein the entire operating range of the internal combustion engine comprises an intake range, an overtravel range (pressure equalization), and a supercharged operating range of the internal combustion engine.

3. The method according to claim 1, wherein the desired position of the throttle valve is provided to a process and a process model simultaneously in accordance with the IMC principle.

4. The method according to claim 3, wherein the calculated desired position is a desired position limited by physical actuator limits.

5. The method according to claim 1, wherein the process determines the position of the throttle valve based on the calculated desired position and measures the intake manifold pressure thus created, and wherein the process model determines a modeled intake manifold pressure based on the calculated desired area position.

6. The method according to claim 5, wherein the feedback control additionally comprises:
   identifying a difference between the measured intake manifold pressure and the modeled intake manifold pressure; and
   identifying a corrected desired intake manifold pressure based on the identified difference.

7. The method according to claim 6, wherein the feedback control additionally filters the identified difference via a filter.

8. The method according to claim 1, wherein the feedback control additionally filters the desired position of the throttle valve via a filter.

9. The method according to claim 1, wherein the feedback control of the throttle position of the throttle valve is assisted by a variable turbine geometry in the supercharged operating range of the internal combustion engine.

10. An engine control unit configured to perform the method according to claim 1.

11. A vehicle comprising an engine control unit according to claim 10.

12. A method for setting a throttle valve, the method comprising:
   feedback controlling a throttle position of the throttle valve in an entire operating range of an internal combustion engine: and
   basing the feedback control on an internal model control (IMC) principle,
   wherein the feedback control comprises:
      receiving a desired intake manifold pressure as input variable; and
      calculating a desired position of the throttle valve based on the desired intake manifold pressure, and
   wherein the desired position of the throttle valve is calculated as follows:

$$A_{DK,soll} = \frac{\frac{V}{KRT_2}\dot{p}_{SPcor,f} + W_{viv}(p) - W_{TEV}}{p_1\sqrt{\frac{2}{RT_1}}\Psi(p)} - A_{DK,leak}$$

where: V is the volume of the intake manifold, R is the specific gas constant of air, K is the isentropic exponent , p is the air pressure in the intake manifold, $T_2$ is the temperature of the air in the intake manifold, $w_{vlv}(p)$ is the outgoing air mass flow as a function of the air pressure p that flows out of the intake manifold through the intake valves, $w_{TEV}$ is the incoming air mass flow that flows into the intake manifold through the fuel-tank ventilation valve, $p_1$ is the air pressure that is present upstream of the throttle valve, $T_1$ is the temperature of the air that flows into the intake manifold through the throttle valve, $\Psi(p)$ is the flow function as a function of the air pressure p and $A_{DK,leak}$ is the effective leakage position of the throttle valve.

13. A method for setting a throttle valve, the method comprising,
   feedback controlling a throttle position of the throttle valve in an entire operating range of an internal combustion engine; and
   basing the feedback control on an internal model control (IMC) principle,
   wherein the feedback control comprises:
      receiving a desired intake manifold pressure as input variable; and
      calculating a desired position of the throttle valve based on the desired intake manifold pressure,
   wherein the process determines the position of the throttle valve based on the calculated desired position and measures the intake manifold pressure thus created, and wherein the process model determines a modeled intake manifold pressure based on the calculated desired position, and wherein the modeled intake manifold pressure is calculated as follows:

$$\hat{p} = \int (\dot{\hat{p}})dt$$

where $$\frac{V}{KRT_2}(\dot{\hat{p}}) = \sum W_G = W_{thr} - W_{viv} + W_{TEV} =$$

$$p_1 \sqrt{\frac{2}{RT_1}} (A_{DK,lim} + A_{DK,leak}) \Psi(p) - w_{viv}(p) + w_{TEV}$$

and where: $W_G$ is the air mass flow in the intake manifold, $W_{thr}$ is the incoming air mass flow that flows into the intake manifold through the throttle valve, $p_1$ is the air pressure upstream of the throttle valve (boost pressure), V is the volume of the intake manifold, R is the specific gas constant of air, K is the isentropic exponent, p is the air pressure in the intake manifold, $T_2$ is the temperature of the air in the intake manifold, $w_{vlv}(p)$ is the outgoing air mass flow as a function of the air pressure p that flows out of the intake manifold through the intake valves, $w_{TEV}$ is the incoming air mass flow that flows into the intake manifold through the fuel-tank ventilation valve, $T_1$ is the temperature of the air that flows into the intake manifold through the throttle valve, $\Psi(p)$ is the flow function as a function of the air pressure p, and $A_{DK,leak}$ is the effective leakage position of the throttle valve.

\* \* \* \* \*